(12) United States Patent
Kazaana

(10) Patent No.: US 12,427,712 B2
(45) Date of Patent: Sep. 30, 2025

(54) SHAPING DEVICE AND SHAPING METHOD

(71) Applicant: MIMAKI ENGINEERING CO., LTD., Nagano (JP)

(72) Inventor: Takeaki Kazaana, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 517 days.

(21) Appl. No.: 17/790,958

(22) PCT Filed: Jan. 8, 2021

(86) PCT No.: PCT/JP2021/000418
§ 371 (c)(1),
(2) Date: Jul. 5, 2022

(87) PCT Pub. No.: WO2021/145274
PCT Pub. Date: Jul. 22, 2021

(65) Prior Publication Data
US 2023/0027651 A1    Jan. 26, 2023

(30) Foreign Application Priority Data

Jan. 14, 2020  (JP) ................................ 2020-003352
Jan. 14, 2020  (JP) ................................ 2020-003353

(51) Int. Cl.
*B29C 64/112*  (2017.01)
*B29C 64/209*  (2017.01)
(Continued)

(52) U.S. Cl.
CPC .......... *B29C 64/112* (2017.08); *B29C 64/209* (2017.08); *B29C 64/393* (2017.08);
(Continued)

(58) Field of Classification Search
CPC ... B29C 64/112; B29C 64/209; B29C 64/393; B29C 64/188; B29C 64/336;
(Continued)

(56) References Cited

U.S. PATENT DOCUMENTS

2016/0129632 A1* 5/2016 Yamazaki ............. B29C 64/112
425/132

FOREIGN PATENT DOCUMENTS

CN    114929456 A  *  8/2022  .......... B29C 64/112
JP    2015071282      4/2015
(Continued)

OTHER PUBLICATIONS

"International Search Report (Form PCT/ISA/210) of PCT/JP2021/000418," mailed on Mar. 23, 2021, with English translation thereof, pp. 1-4.

*Primary Examiner* — JaMel M Nelson
(74) *Attorney, Agent, or Firm* — JCIPRNET

(57) ABSTRACT

A shaping device shaping an object by forming and layering each layer based on slice images indicating cross-sectional shapes and color arrangements of the object include: a color ink ejection position determining means determining presence/absence of ejection of each ink of colors for coloring to each ejection position constituting the layer based on the slice image corresponding to the layer; a clear ink ejection position determining means determining necessity of ejection of a clear ink to each ejection position based on presence/absence of ejection of ink of each color for coloring to each ejection position determined in the color ink ejection position determining means; and a layer forming means causing a color ink head and the clear ink head to eject ink of each color and the clear ink to each ejection position as determined by the color ink ejection position and clear ink ejection position determining means.

12 Claims, 12 Drawing Sheets

(51) Int. Cl.
*B29C 64/393* (2017.01)
*B29C 64/188* (2017.01)
*B33Y 10/00* (2015.01)
*B33Y 30/00* (2015.01)
*B33Y 50/02* (2015.01)

(52) U.S. Cl.
CPC .............. *B29C 64/188* (2017.08); *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/02; B29K 2995/002
USPC ........................................................ 264/308
See application file for complete search history.

(56) References Cited

FOREIGN PATENT DOCUMENTS

| | | |
|---|---|---|
| JP | 2017196797 | 11/2017 |
| JP | 2018030332 | 3/2018 |
| JP | 2018149777 | 9/2018 |

* cited by examiner

SHAPING DEVICE AND SHAPING METHOD

CROSS-REFERENCE TO RELATED APPLICATION

This application is a 371 application of the International PCT application serial no. PCT/JP2021/000418, filed on Jan. 8, 2021, which claims the priority benefits of Japan Patent Application No. 2020-003352, filed on Jan. 14, 2020 and Japan Patent Application No. 2020-003353, filed on Jan. 14, 2020. The entirety of each of the above-mentioned patent applications is hereby incorporated by reference herein and made a part of this specification.

BACKGROUND OF THE INVENTION

Field of the Invention

The present invention relates to a shaping device and a shaping method.

Description of Related Art

Conventionally, a shaping device (3D printer) for shaping a shaped object using an inkjet head is known (see e.g., Patent Literature 1). In such a shaping device, for example, the shaped object is shaped through a layered shaping method that performs shaping by overlapping a plurality of layers of ink formed by an inkjet head.

Patent Literature 1: Japanese Unexamined Patent Publication No. 2015-071282

BRIEF SUMMARY OF THE INVENTION

Technical Problems

When shaping a shaped object through the layered shaping method, the layering thickness of one layer needs to be made as uniform as possible so as not to cause a shaping defect.

As a method for making the layering thickness of one layer uniform, for example, there is a method for, after ejecting color ink, ejecting a larger and constant amount of clear ink so that the layering thickness becomes greater than or equal to an expected layering thickness regardless of the amount of the ejected color ink, and scraping the ink exceeding the expected layering thickness with a flattening roller.

However, in the case of this method, since the ink scraped off by the flattening roller is discarded, if the scraped amount is large, cost is wasted accordingly. Furthermore, the quality of the surface of the shaped object degrades as the scraped amount of ink increases.

The present invention thus provides a shaping device and a shaping method capable of overcoming such problem.

Solutions to Problems

A shaping device of the present invention relates to a shaping device that shapes a shaped object by forming and layering each layer as a layer of ink based on a plurality of slice images indicating cross-sectional shapes and color arrangements of respective layers of the shaped object at different positions in a layering direction defined in advance, the shaping device including a color ink ejection position determining means that determines presence or absence of ejection of each of inks of a plurality of colors for coloring to each ejection position constituting the layer by a quantization process based on the slice image corresponding to the layer; a clear ink ejection position determining means that determines necessity of ejection of a clear ink, which is a transparent ink, to each of the ejection position based on presence or absence of ejection of the ink of each of the colors for coloring to each of the ejection positions determined by the color ink ejection position determining means; a color ink head capable of ejecting each of the inks of the plurality of colors; a clear ink head capable of ejecting the clear ink; and a layer forming means that forms the layer by causing the color ink head and the clear ink head to eject the ink of each of the colors and the clear ink to each of the ejection positions according to determinations in the color ink ejection position determining means and the clear ink ejection position determining means.

The color ink ejection position determining means may further determine a dot size of the ink to be ejected; the clear ink ejection position determining means may determine the presence or absence of ejection and a dot size of the clear ink to each of the ejection positions based on the presence or absence of ejection and the dot size of each of the inks of the plurality of colors for coloring to each of the ejection positions determined by the color ink ejection position determining means; the color ink head and the clear ink head may each be capable of ejecting inks of a plurality of types of dot sizes; and the layer forming means may cause the color ink head and the clear ink head to eject the ink of each of the colors and the clear ink in the dot sizes according to the determinations by the color ink ejection position determining means and the clear ink ejection position determining means to each of the ejection position.

Thus, for each ejection position, the clear ink having a dot size corresponding to the dot size of the ejected color ink can be filled.

When the dot size is expressed by a numerical value in which a value increases as a size of a dot increases, the clear ink ejection position determining means may determine the dot size of the clear ink to be ejected to the ejection position such that a sum of values of the dot sizes of the inks of the colors for coloring ejected to the ejection position determined by the color ink ejection position determining means and a value of the dot size of the clear ink ejected to the ejection position becomes as close as possible to a predetermined reference value.

The thickness of the layer of ink to be formed thus can be uniformized.

A shaping method of the present invention relates to a shaping method that shapes a shaped object by forming and layering each layer as a layer of ink based on a plurality of slice images indicating cross-sectional shapes and color arrangements of respective layers of the shaped object at different positions in a layering direction defined in advance, the shaping method including a color ink ejection position determining step of determining presence or absence of ejection of each of inks of a plurality of colors for coloring to each ejection position constituting the layer by a quantization process based on the slice image corresponding to the layer; a clear ink ejection position determining step of determining necessity of ejection of a clear ink, which is a transparent ink, to each of the ejection positions based on presence or absence of ejection of the ink of each of the colors for coloring to each of the ejection positions determined in the color ink ejection position determining step; and a layer forming step of forming the layer by causing a color ink head and a clear ink head to eject the ink of each of the colors and the clear ink, respectively, to each of the ejection position according to determinations in the color ink ejection position determining step and the clear ink ejection position determining step.

The color ink ejection position determining step may further determine a dot size of the ink to be ejected; the clear ink ejection position determining step may determine the presence or absence of ejection and a dot size of the clear ink to each of the ejection positions based on the presence or absence of ejection and the dot size of each of the inks of the plurality of colors for coloring to each of the ejection position determined by the color ink ejection position determining step; the color ink head and the clear ink head may each be capable of ejecting inks of a plurality of types of dot sizes; and the layer forming step may cause the color ink head and the clear ink head to eject the ink of each of the colors and the clear ink in the dot sizes according to the determinations in the color ink ejection position determining step and the clear ink ejection position determining step each of the ejection position.

Thus, for each ejection position, the clear ink having a dot size corresponding to the dot size of the ejected color ink can be filled.

When the dot size is expressed by a numerical value in which a value increases as a size of a dot increases, the clear ink ejection position determining step may determine the dot size of the clear ink to be ejected to the ejection position such that a sum of values of the dot sizes of the inks of the colors for coloring ejected to the ejection position determined by the color ink ejection position determining step and a value of the dot size of the clear ink ejected to the ejection position becomes as close as possible to a predetermined reference value.

The thickness of the layer of ink to be formed thus can be uniformized.

A shaping device of the present invention relates to a shaping device that shapes a shaped object by forming and layering each layer as a layer of ink based on a plurality of slice images indicating cross-sectional shapes and color arrangements of respective layers of the shaped object at different positions in a layering direction defined in advance, the shaping device including a color ink ejection position determining means that determines presence or absence of ejection of each of inks of a plurality of colors for coloring to each ejection position constituting the layer by a quantization process based on the slice image corresponding to the layer; a clear ink ejection position determining means that determines necessity of ejection of a clear ink, which is a transparent ink, to the ejection position corresponding to a pixel based on a density of the pixel for each pixel in a coloring region of the slice image, prior to execution of the quantization process by the color ink ejection position determining means; a color ink head capable of ejecting each of the inks of the plurality of colors; a clear ink head capable of ejecting the clear ink; and a layer forming means that forms the layer by causing the color ink head and the clear ink head to eject the ink of each of the colors and the clear ink to each of the ejection position according to determinations by the color ink ejection position determining means and the clear ink ejection position determining means.

The slice image may be an image in which a pixel value is indicated in multiple gradations for each color of a predetermined color system in each of the pixel.

Furthermore, the slice image may be divided for each color of the inks of the plurality of colors, and include a plurality of images in which pixel values are indicated in multiple gradations at each of the pixels.

The determination accuracy of the necessity of ejection of the clear ink can be improved as compared with a case of determining based on the slice image of before division by determining the necessity of ejection of the clear ink to each ejection position based on the slice image of after division.

The clear ink ejection position determining means may further determine a dot size of the ink based on the density of the pixel in a case where ejection is present; the clear ink head may be capable of ejecting inks of a plurality of types of dot sizes; and the layer forming means may cause the clear ink head to eject the clear ink having a dot size according to the determination by the clear ink ejection position determining means to each of the ejection position.

Thus, the clear ink can be filled in a more appropriate amount as compared with when the dot size is uniform.

A shaping method of the present invention relates to a shaping method that shapes a shaped object by forming and layering each layer as a layer of ink based on a plurality of slice images indicating a cross-sectional shape and a color arrangement of each layer of the shaped object at different positions in a layering direction defined in advance, the shaping method including a color ink ejection position determining step of determining presence or absence of ejection of each of the inks of a plurality of colors for coloring to each of the ejection positions constituting the layer by a quantization process based on the slice image corresponding to the layer; a clear ink ejection position determining step of determining necessity of ejection of a clear ink, which is a transparent ink, to the ejection position corresponding to a pixel based on a density of the pixel for each pixel in a coloring region of the slice image, prior to execution of the quantization process in the color ink ejection position determining step; and a layer forming step of forming the layer by causing a color ink head and a clear ink head to eject the ink of each color and the clear ink to each of the ejection positions according to the determination in the color ink ejection position determining step and the clear ink ejection position determining step.

The slice image may be an image in which a pixel value is indicated in multiple gradations for each color of a predetermined color system in each of the pixels.

Furthermore, the slice image may be divided for each color of the inks of the plurality of colors, and include a plurality of images in which pixel values are indicated in multiple gradations at each of the pixels.

The determination accuracy of the necessity of ejection of the clear ink can be improved as compared with a case of determining based on the slice image of before division by determining the necessity of ejection of the clear ink to each ejection position based on the slice image of after division.

The clear ink ejection position determining step may further determine the dot size of the ink based on the density of the pixel in a case where ejection is present; the clear ink head may be capable of ejecting inks of a plurality of types of dot sizes; and the layer forming means may cause the clear ink head to eject a clear ink having a dot size according to the determination by the clear ink ejection position determining step to each of the ejection positions.

Thus, the clear ink can be filled in a more appropriate amount as compared with when the dot size is uniform.

Effect of the Invention

The shaping device and the shaping method of the present invention determine the necessity of ejection of the clear ink for each ejection position and ejects the clear ink according thereto, whereby the usage amount of the clear ink at the time of forming each layer can be saved, and the scraped amount of ink at the time of flattening can also be reduced, so that the degradation of the quality of the surface of the shaped object can be suppressed.

DETAILED DESCRIPTION OF THE INVENTION

Figure 1:
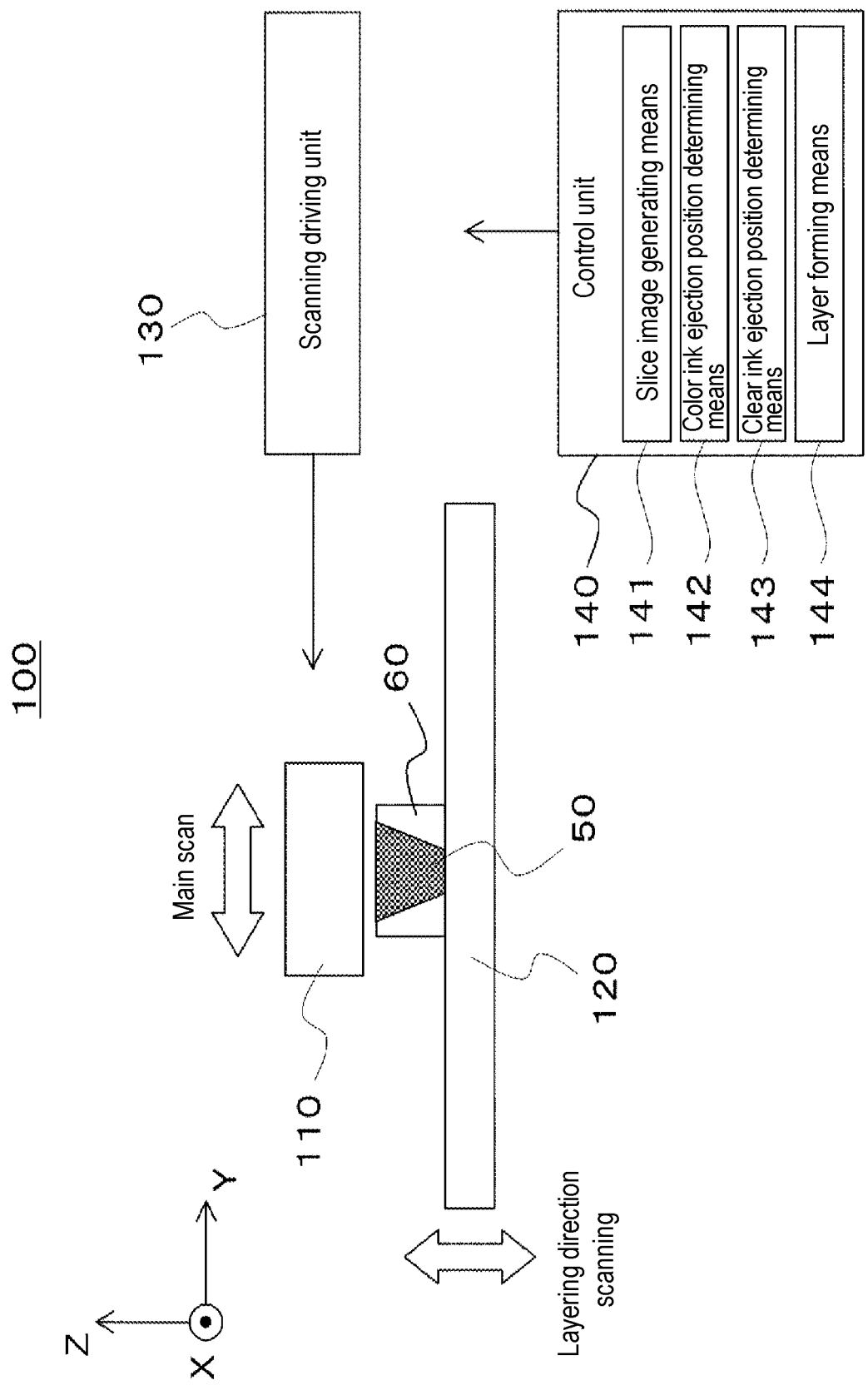
FIG. 1 is a view illustrating one example of a configuration of a shaping device 100 of the present invention.

Hereinafter, an embodiment of the present invention will be described with reference to the drawings. Note that, in the following description and the drawings, the same functional units are denoted by the same reference numerals, and the functional units that have been described once will not be described or will be described within a necessary range.

FIG. 1 shows one example of a configuration of a shaping device 100 of the present invention. The shaping device 100 is a shaping device (3D printer) that shapes a stereoscopic shaped object 50 through the layered shaping method. The layered shaping method mentioned here is a method for shaping the shaped object 50 by slicing data (hereinafter referred to as "shaped object data".) indicating the three-dimensional shape, the color of the surface, and the like of the shaped object 50 by the thickness of the layer of ink in a predetermined layering direction, and sequentially forming and layering each layer as a layer of ink based on the slice image of each layer obtained thereby.

Figure 2:
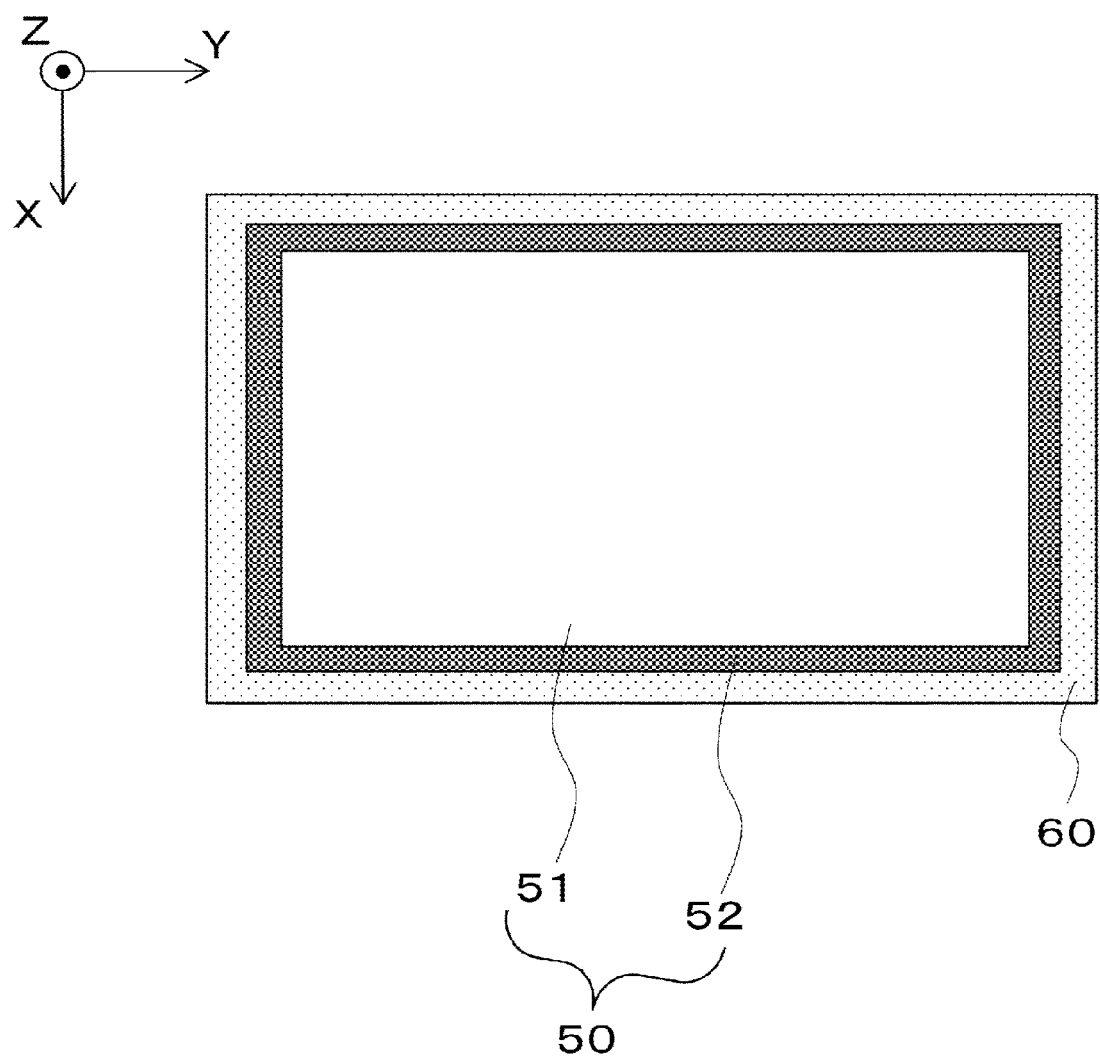
FIG. 2 is a view illustrating one example of a shaped object 50 shaped by the shaping device 100.

FIG. 2 is a view showing an example of the shaped object 50 shaped by the shaping device 100, and shows the configuration of an X-Y cross section, which is a cross section of the shaped object 50 orthogonal to the layering direction (Z direction). The configurations of the Z-X cross section and the Z-Y cross section of the shaped object 50 perpendicular to the Y direction and the X direction also have similar configuration.

The shaped object 50 includes at least an interior region 51 and a coloring region 52. The shaping device 100 shapes the shaped object 50 by sequentially forming and layering layers of ink having such a cross-sectional configuration.

The interior region 51 is a region that forms the inside of the shaped object 50. Furthermore, in the present embodiment, the interior region is a region also having the function of a light reflecting region by forming the interior region 51 with white ink. The light reflecting region is a region having light reflectivity for reflecting light entering from the outer side of the shaped object 50 through the coloring region 52, and the like. The light reflecting region may be formed as a separate region formed at a periphery of the interior region 51. In this case, the interior region 51 may be formed using an ink other than the white ink.

The coloring region 52 is a region having a predetermined thickness colored with a color ink. The shaping device 100 forms the coloring region 52 at the periphery of the interior region 51 in each layer by ejecting the color ink of each color from each inkjet head of a head unit 110 and landing it on the periphery of the interior region 51. At this time, various colors can be represented in the coloring region 52 by appropriately determining the presence or absence of the ejection of the color ink of each color to each of the ejection positions (each position where the ink ejected from the inkjet head can be landed, specified according to the shaping resolution of the shaping device 100) configuring the coloring region 52.

Furthermore, when the amount of color ink deposited at each of the ejection positions varies due to the difference in the color to be represented, a layer of ink with irregularities is formed, and layering such a layer leads to degradation in quality and strength of the shaped object 50. Therefore, in the present invention, layer is flattened and the usage amount of the clear ink is suppressed by intensively ejecting the clear ink to the ejection position where the color ink is not ejected, and the like by a method to be described later.

A region other than the interior region 51 and the coloring region 52 may be further formed according to the quality and the like required for the shaped object 50. For example, a transparent region (interior clear region) may be formed by ejecting the clear ink between the interior region 51 and the coloring region 52. By forming the interior clear region, for example, the color mixing of the ink can be prevented from occurring between the interior region 51 and the coloring region 52. Furthermore, a transparent region (exterior clear region) may be formed by ejecting the clear ink to the periphery of the coloring region 52. By forming the exterior clear region, for example, the outer surface of the shaped object 50 can be protected.

The shaping device 100 may shape the shaped object 50 and form a support layer 60 at a periphery as necessary. The support layer 60 is, for example, a layered structural object that supports the shaped object by surrounding the outer periphery of the shaped object 50 being shaped, and can stabilize the posture of the shaped object 50 being shaped by being formed at the periphery when the shaped object 50 has a shape that cannot maintain the stability of the posture alone. In a case where the support layer 60 is formed, the support layer is formed together with the shaped object 50 using a known material for the support layer that is easy to remove, and is removed after the shaping of the shaped object 50 is completed.

The shaping device 100 includes, for example, as illustrated in FIG. 1, a head unit 110, a shaping table 120, a scanning driving unit 130, and a control unit 140. However, the shaping device 100 does not necessarily have to be physically integrally configured, and for example, a configuration may be adopted in which one or a plurality of functional units is cut out as another device, and information is transmitted and received by wired communication or wireless communication, and the like to function integrally.

Other than the points described below, the shaping device 100 may have a configuration same as or similar to a known shaping device. More specifically, other than the points described below, the shaping device 100 may have a feature same as or similar to a known shaping device that carries out shaping by ejecting a droplet which is to become the material of a shaped object 50 using an inkjet head. Furthermore, other than the illustrated configuration, the shaping device 100 may also include, for example, various types of configurations necessary for shaping, and the like of the shaped object 50.

The head unit 110 is a part that ejects the material of the shaped object 50 (shaped object material). Specifically, the material of the shaped object 50 is ink, and more specifically, for example, is ink that cures according to a predetermined condition. The head unit 110 includes a plurality of inkjet heads 111, and ejects a predetermined ink from each inkjet head to each of the ejection positions constituting the layer of ink under the control of the control unit 140 to be described later. Each ejection position is determined according to the shaping resolution of the shaping device 100. Then, the ink that landed on each of the ejection positions is cured according to a predetermined condition to form a layer of ink. Moreover, in the present example, an ultraviolet-curable ink (UV ink) that cures from a liquid state by irradiation of ultraviolet light is used as the ink that cures according to a predetermined condition.

The head unit 110 further ejects ink used as a support material, which is a material of the support layer 60, as necessary, in addition to the ink used as the material of the shaped object 50. The head unit 110 thus forms the support layer 60 at the periphery of the shaped object 50.

Figure 3:
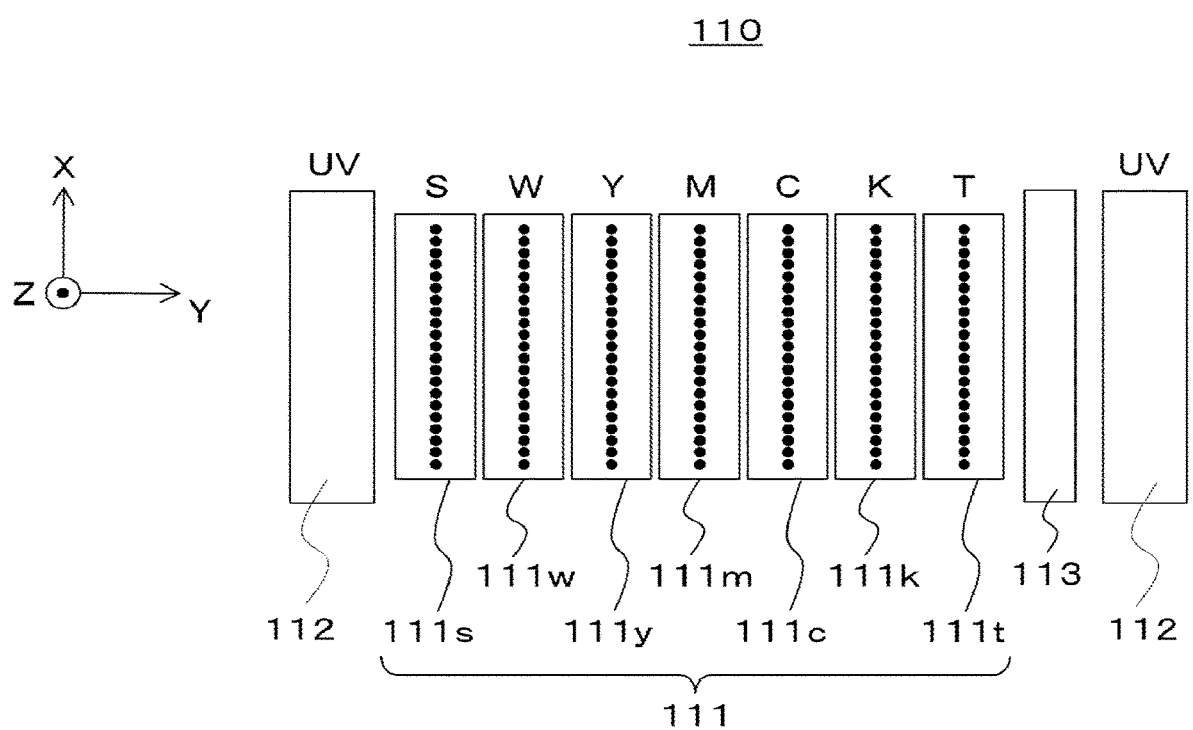
FIG. 3 is a view illustrating one example of a configuration of the head unit 110.

The configuration of the head unit 110 will be described in more detail. FIG. 3 illustrates an example of a configuration of the head unit 110. In the present example, the head unit 110 includes a plurality of inkjet heads 111, a plurality of ultraviolet light sources 112, and a flattening roller 113. As illustrated in the drawing, the plurality of inkjet heads 111 include an inkjet head 111s, an inkjet head 111w, an inkjet head 111y, an inkjet head 111m, an inkjet head 111c, an inkjet head 111k, and an inkjet head 111t. The plurality of inkjet heads 111 are an example of an ejection head, and are, for example, arranged side by side in the main scanning direction with their positions in the sub scanning direction aligned. Furthermore, each inkjet head includes a nozzle row, in which a plurality of nozzles are lined in a predetermined nozzle row direction, on a surface facing the shaping table 120. Moreover, in the present example, the nozzle row direction is a direction parallel to the sub scanning direction.

The inkjet head 111s is a support material inkjet head that ejects ink used as the support material. For example, a known material for the support layer can be suitably used for the support material. Among the plurality of inkjet heads 111 in the head unit 110, the inkjet head other than the inkjet head 111s ejects ink to become the material of the shaped object 50. The ink to become the material of the shaped object 50 is an ink configuring a part of the shaped object when the shaped object 50 is completed.

The inkjet head 111w is a white ink inkjet head that ejects ink of white color (W color). The white ink is an example of an ink having light reflectivity, and is used, for example, when forming a region (light reflecting region) having a property of reflecting light in the shaped object 50. In the example illustrated in FIG. 2, the interior region 51 is caused to function as a light reflecting region by forming the interior region 51, which is a region configuring the inside of the shaped object 50, with white ink.

The inkjet head 111y, the inkjet head 111m, the inkjet head 111c, and the inkjet head 111k are color ink inkjet heads used at the time of shaping the coloring region 52 of the shaped object 50. More specifically, the inkjet head 111y ejects ink of yellow color (Y color). The inkjet head 111m ejects ink of magenta color (M color). The inkjet head 111c ejects ink of cyan color (C color). Furthermore, the inkjet head 111k ejects ink of black color (K color). In addition, in the present example, each color of CMYK is an example of a process color used for full color representation by subtractive color mixing method.

The inkjet head 111t is a clear ink inkjet head that ejects clear ink. The clear ink is, for example, a clear ink that is colorless and transparent (T) with respect to visible light. The clear ink is used at the time of shaping the coloring region 52 of the shaped object 50, and the like.

As the color ink inkjet head and the clear ink inkjet head, a head (binary head) in which only one type of ejection amount can be set at a normal ejection timing may be adopted, or a head (multi-value head) in which a plurality of types of ejection amounts (dot sizes) can be selected and set may be adopted, as necessary.

The plurality of ultraviolet light sources 112 are light sources (UV light sources) for curing ink, and generate an ultraviolet light that cures the ultraviolet-curable ink. Moreover, in the present example, each of the plurality of ultraviolet light sources 112 is disposed on one end side and the other end side in the main scanning direction in the head unit 110 so as to sandwich the plurality of inkjet heads in between. For example, UVLED (ultraviolet LED) and the like can be suitably used as the ultraviolet light source 112. Furthermore, it is also conceivable to use a metal halide lamp, a mercury lamp, and the like for the ultraviolet light source 112.

The flattening roller 113 is a flattening means for flattening the layer of ink formed by the ink ejected from each inkjet head. The flattening roller 113 comes into contact with a surface of the layer of ink to remove a part of the ink before curing thus flattening a layer of ink and adjusting the thickness of the layer of ink to a thickness set in advance in a predetermined scanning cycle (e.g., time of main scan).

The layer of ink forming the shaped object 50 can be appropriately formed by using the head unit 110 having the above configuration. Furthermore, the shaped object 50 can be appropriately shaped by forming a plurality of layers of ink in an overlapping manner.

The shaping table 120 is a table-shaped member that supports the shaped object 50 being shaped, and is disposed at a position facing the inkjet head in the head unit 110, and has the shaped object 50 being shaped and the support layer 60 mounted on the upper surface thereof. Furthermore, in the present example, the shaping table 120 has a configuration in which at least the upper surface is movable in a layering direction (Z direction in the figure), and moves at least the upper surface in accordance with the progress of the shaping of the shaped object 50 by being driven by the scanning driving unit 130. The layering direction is a direction in which the layer of ink is layered in the layered shaping method. Furthermore, in the present example, the layering direction is a direction orthogonal to the main scanning direction (Y direction in the figure) and the sub scanning direction (X direction in the figure) set in advance in the shaping device 100.

The scanning driving unit 130 is a driving unit that causes the head unit 110 to perform a scanning operation of relatively moving with respect to the shaped object 50 being shaped. When the head unit 110 relatively moves with respect to the shaped object 50 being shaped, this means that the head unit 110 relatively moves with respect to the shaping table 120. Furthermore, causing the head unit 110 to perform the scanning operation means causing the inkjet head of the head unit 110 to perform the scanning operation. Moreover, in the present example, the scanning driving unit 130 causes the head unit 110 to perform the main scan (Y scanning), the sub scan (X scanning), and the layering direction scanning (Z scanning) as the scanning operation.

The main scan is an operation in which the head unit 110 ejects ink while relatively moving in the main scanning direction with respect to the shaped object 50 being shaped. The sub scan is an operation in which the head unit 110 relatively moves with respect to the shaped object 50 being shaped in the sub scanning direction orthogonal to the main scanning direction. The sub scan can also be considered as an operation in which the head unit 110 relatively moves with respect to the shaping table 120 in the sub scanning direction by a feed amount set in advance, and the like. Moreover, the layering direction scanning is an operation of relatively moving the head unit 110 in the layering direction with respect to the shaped object 50 being shaped. The scanning driving unit 130 adjusts the relative position of the inkjet head with respect to the shaped object 50 being shaped in the layering direction by causing the head unit 110 to perform the layering direction scanning in accordance with the progress of the shaping operation. According to such a configuration, the shaping of the shaped object 50 by the layered shaping method can be appropriately carried out.

The control unit 140 includes a processor and the like, and performs generation of a slice image, determination of an ejection position where each ink ejected by each inkjet head is landed, control of ejection of each ink by each inkjet head to each of the ejection positions, and the like.

The control unit 140 includes a slice image generating means 141, a color ink ejection position determining means 142, a clear ink ejection position determining means 143, and a layer forming means 144. The processing performed by each of these means can be realized by a processor. Specifically, each processing can be realized by a processor that operates based on information such as a program and a memory that stores information such as a program in which the content of each processing is described. In the processor, for example, the function of each means may be realized by individual hardware, or the function of each means may be realized by integrated hardware. As the processor, for example, various processors such as a CPU, a GPU, and a DSP can be used. As the memory, for example, a semiconductor memory such as an SRAM or a DRAM, a magnetic storage device such as a hard disk device, an optical storage device, or the like can be used. The memory stores a computer readable instruction, and the processor executes the instruction to implement the processing of each means of the control unit 140.

Figure 4:
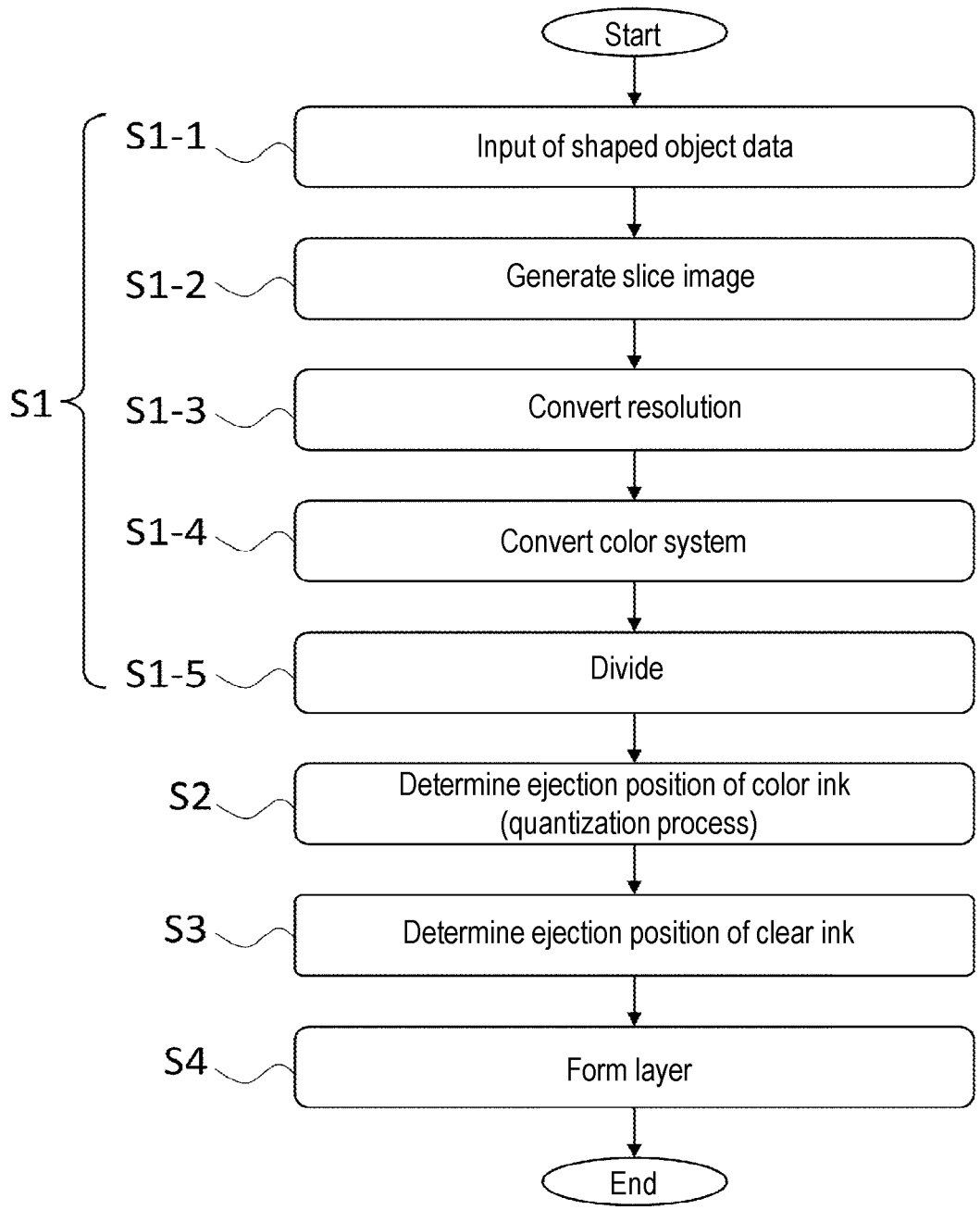
FIG. 4 is a diagram illustrating an example of a processing flow by a control unit 140.

Next, the processing performed by each means included in the control unit 140 will be described. The processing flow is shown in FIG. 4.

Prior to the execution of the forming operation of the shaped object 50, the slice image generating means 141 generates a plurality of slice images indicating the cross-sectional shape and the color arrangement of each layer of the shaped object 50 at different positions in a layering direction defined in advance, performs conversion to a resolution and a color system corresponding to the shaping device 100, and then divides by each color represented by the ink of each color used in the shaping device 100 (S1: slice image generating step).

Specifically, first, shaped object data indicating the shaped object 50 is input (S1-1). The shaped object data is data indicating the three-dimensional shape, the color of the surface, the direction at the time of shaping, and the like of the shaped object 50. In the shaped object data, the color of the surface may be represented by an arbitrary color system such as an RGB color system or a CMYK color system that does not depend on the shaping device 100.

Subsequently, the slice image generating means 141 generates a plurality of slice images indicating the cross-sectional shape and the color arrangement of each layer of the shaped object 50 at different positions in a layering direction defined in advance based on the shaped object data (S1-2). Specifically, according to the processing of slicing the shaped object data with the thickness of the layer of ink in the layering direction, extracting the cross-sectional shape and the surface color for each of the sliced portions, and providing the coloring region 52 in which the surface color has a predetermined thickness at the periphery of the interior region 51, a slice image indicating the cross-sectional shape of the interior region 51 and the coloring region 52, the color arrangement of the coloring region 52, and the like is generated. The respective slice image corresponds to each of a plurality of layers of ink formed at the time of shaping the shaped object.

Subsequently, in a case where the resolution of the slice image is different from the shaping resolution of the shaping device 100, the slice image generating means 141 converts the resolution to the shaping resolution of the shaping device 100 (S1-3).

Furthermore, in a case where the color represented in the coloring region 52 of the slice image is a color that does not depend on the shaping device 100, the slice image generating means 141 performs conversion into a color corresponding to the color ink of each color used in the shaping device 100 (S1-4).

Specifically, for example, first, color conversion to the Lab color system is performed on a color represented in a format not dependent on the shaping device 100 in the coloring region 52 of the slice image based on an input profile prepared in advance. The input profile mentioned here is, for example, an ICC profile that associates the color used in the shaped object data and the color space of the Lab color system. Using this, for example, a color represented in the shaped object data in the RGB color system or the CMYK color system is converted into a color represented in the Lab color system.

After carrying out the color conversion to the Lab color system, the slice image generating means 141 carries out the color conversion corresponding to the color of the color ink used (dependent on the shaping device 100) in the shaping device 100 using the device profile prepared in advance according to the characteristics of the shaping device 100. The input profile mentioned here is, for example, an ICC profile that associates the color space of the Lab color system and the color of the color ink used in the shaping device 100. Using this, a color represented in the Lab color system is converted into the color of the color ink (e.g., the color of the CMYK color system) used in the shaping device 100.

In a case where the shaping execution data is considered to be generated simply based on the shaped object data, consideration is made to carry out the color conversion through a simpler method without carrying out the color conversion and the like using the profile such as the ICC profile. That is, for example, it is also conceivable to convert a color represented in the RGB color system in the shaped object data into a color represented in the CMYK color system in a formal manner according to a certain conversion formula or the like.

However, when color conversion is performed through such a simple method, it may become difficult to appropriately represent a desired color in the shaped object 50. For example, when shaping the stereoscopic shaped object 50, the range of colors (gamut) that can be represented by a combination of inks of the same color is usually smaller than when printing a two-dimensional image. Therefore, when color conversion is performed through a simple method without using an ICC profile or the like, color collapse or the like is likely to occur. Therefore, color conversion can be appropriately performed with higher accuracy by performing color conversion using a device profile or the like corresponding to the ink to use.

Subsequently, the slice image generating means 141 divides the slice image of each layer after performing these processing by each color represented by the ink of each color (S1-5).

Specifically, in the division, in a case where each pixel of the coloring region 52 of the slice image is represented by, for example, the CMYK color system, four divided slice images corresponding to the inks of respective colors of C, M, Y, and K are generated. Furthermore, since at least the interior region 51 is formed in white, a divided slice image corresponding to white ink is generated. Furthermore, when forming the support layer 60, a divided slice image corresponding to the ink used as the support material is generated.

The color ink ejection position determining means 142 determines the presence or absence of ejection of each of the inks of a plurality of colors for coloring to each of the ejection positions forming the layer of ink by the quantization process based on the slice image corresponding to the layer of ink (S2: color ink ejection position determining step). Specifically, for each layer of ink configuring the shaped object 50, the quantization process is executed on each divided slice image corresponding to the divided ink of each color.

The quantization process described herein is a processing of converting the gradation of the light and dark of the color represented in multiple gradations into lesser gradations using, for example, an error diffusion method or a dither method for each pixel configuring the divided slice image.

When the color ink inkjet head included in the head unit 110 is a head (binary head) in which only one type of ejection amount can be set at a normal ejection timing, the lesser gradations here is two gradations corresponding to the presence and absence of ejection. In this case, the divided slice image in which each pixel is expressed in multiple gradations is converted into a divided slice image in which each pixel is expressed in two gradations.

On the other hand, when the color ink inkjet head included in the head unit 110 is a head (multi-value head) in which a plurality of types of ejection amounts (dot sizes) can be selected and set, for example, if large, medium, and small dot sizes can be selected, the lesser gradation is four gradations corresponding to the presence of ejection (large dot size), the presence of ejection (medium dot size), the presence of ejection (small dot size), and the absence of ejection, respectively. Therefore, in this case, the divided slice image in which each pixel is expressed in multiple gradations is converted into, for example, three divided slice images in which each pixel is expressed in two gradations (i.e., the presence of dots and the absence of dots) for each of the large dot size, the middle dot size, and the small dot size.

Note that the order illustrated in the processing flow of the slice image generating means 141 in FIG. 4 is not limited thereto, and the included processing contents may be appropriately changed within an executable range.

The clear ink ejection position determining means 143 determines the necessity to eject the clear ink, which is a transparent ink, to each of the ejection positions based on the presence or absence of ejection of the ink of each color for coloring at each of the ejection positions determined by the color ink ejection position determining means 142 (S3: clear ink ejection position determining step).

A first specific example of a method for determining the necessity of ejection of the clear ink will be described with reference to FIG. 5. (*a*) and (*b*) of FIG. 5 illustrate that the pixels Pc1, Pc2, Pc3, and Pc4 at the same position in the divided slice image divided into four sheets corresponding to each of the four color inks c1, c2, c3, and c4 are extracted, and the presence or absence of ejection of the color ink of each color to the ejection position corresponding to the pixel position can be identified by coloring of black or white of the pixels Pc1, Pc2, Pc3, and Pc4, and specifically, white indicates the absence of ejection of the color ink to the corresponding ejection position and black indicates the presence of ejection.

Figure 5:
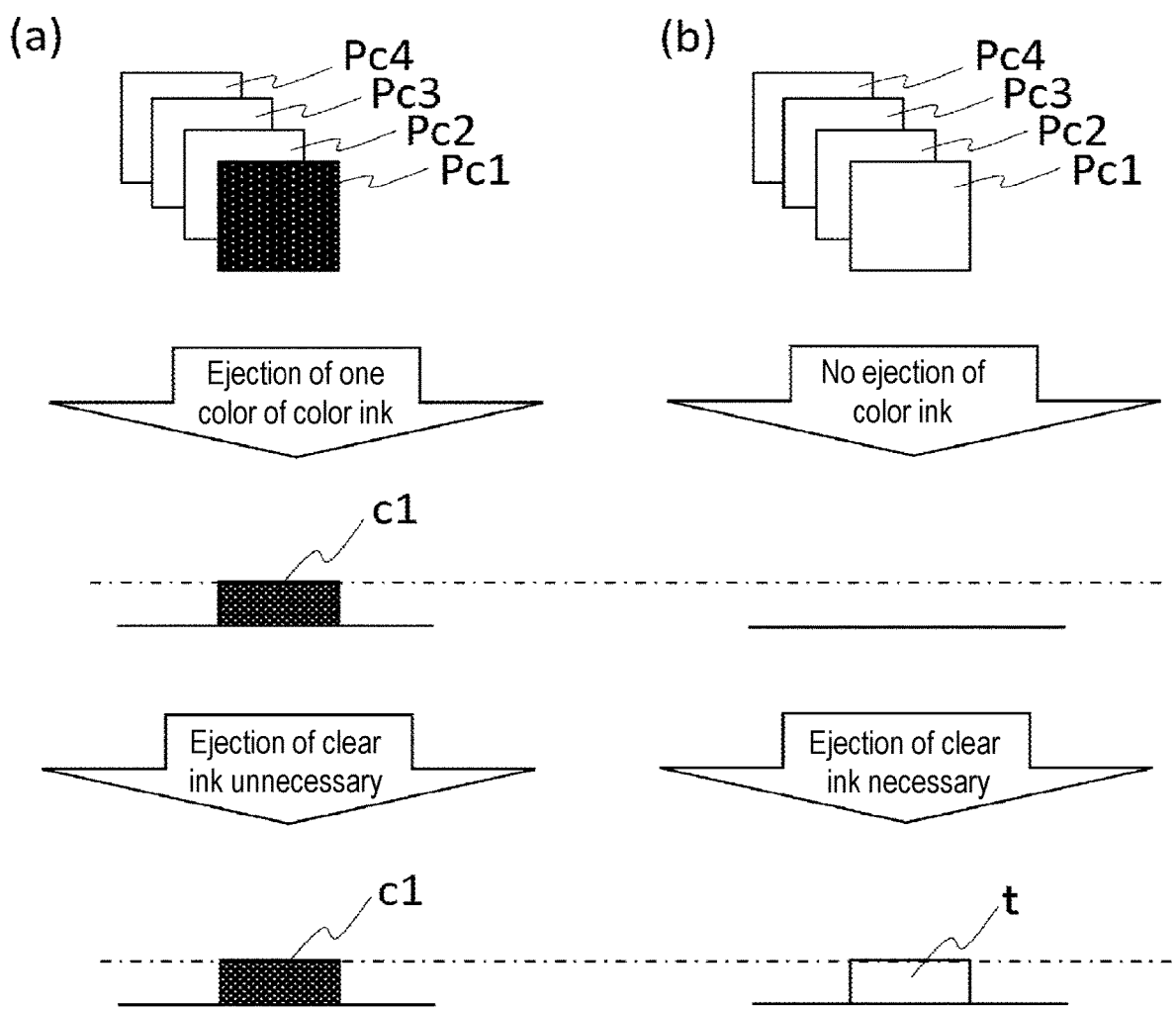
FIG. 5 is a diagram for describing a first specific example of an ejection position determining method in a clear ink ejection position determining means 143.

Assuming that the color ink ejected to one ejection position is at most one color, the clear ink is not ejected to the position where any color ink (here, the color ink c1) is ejected as illustrated in (*a*) of FIG. 5, and the clear ink t is determined to be ejected to the ejection position where no color ink of any color is ejected as illustrated in (*b*) of FIG. 5 to match the thickness of the layer with the position where the color ink is ejected, whereby the thickness of the layer of ink can be uniformized.

A second specific example of a method for determining the necessity of ejection of the clear ink will be described with reference to FIG. 6. Similar to (*a*) and (*b*) of FIG. 5, (*a*), (*b*), and (*c*) of FIG. 6 illustrate that the pixels Pc1, Pc2, Pc3, and Pc4 at the same position in the divided slice image divided into four sheets corresponding to each of the four color inks c1, c2, c3, and c4 are extracted, and the presence or absence of ejection of the color ink of each color to the ejection position corresponding to the pixel position can be identified by coloring of black or white of the pixels Pc1, Pc2, Pc3, and Pc4.

In the example of FIG. 5, it is assumed that the color ink ejected to one ejection position is at most one color, but for example, in the CMYK color system, two colors may be ejected to one ejection position depending on the color to represent. Assuming that the clear ink inkjet head is a binary head, the clear ink is not ejected to the ejection position where the color inks of two colors (here, the color inks c1, c3) are ejected as illustrated in (*a*) of FIG. 6, and the clear ink t is ejected to the ejection position where only the color ink of one color (here, the color ink c1) is ejected as illustrated in (*b*) of FIG. 6, whereby the thickness of the layer can be matched with the ejection position where the color inks of two inks are ejected. On the other hand, as illustrated in (*c*) of FIG. 6, at the ejection position where no color ink of any color is ejected, the same amount of the clear ink t as in the case of (*b*) of FIG. 6 is merely ejected, whereby the thickness of the layer becomes insufficient with respect to the ejection position where the color inks of two colors are ejected. However, it has been experimentally confirmed that even if the thickness is insufficient for some ejection positions as described above, for example, the shortage is substantially compensated by the excessively ejected ink flowing into other ejection positions, and the like when the flattening roller 113 flattens the layer of ink at a predetermined scanning cycle. Thus, when the color inks of a maximum of two colors are ejected to one ejection position, the thickness of the layer of ink can be uniformized even if the clear ink inkjet head is a binary head by determining the ejection position of the clear ink through the method illustrated in FIG. 6.

A third specific example of a method for determining the necessity of ejection of the clear ink will be described with reference to FIG. 7. Similar to (*a*), (*b*), and (*c*) of FIG. 6, (*a*), (*b*), and (*c*) of FIG. 7 illustrate that the pixels Pc1, Pc2, Pc3, and Pc4 at the same position in the divided slice image divided into four sheets corresponding to each of the four color inks c1, c2, c3, and c4 are extracted, and the presence or absence of ejection of the color ink of each color to the ejection position corresponding to the pixel position can be identified by coloring of black or white of the pixels Pc1, Pc2, Pc3, and Pc4.

Figure 6:
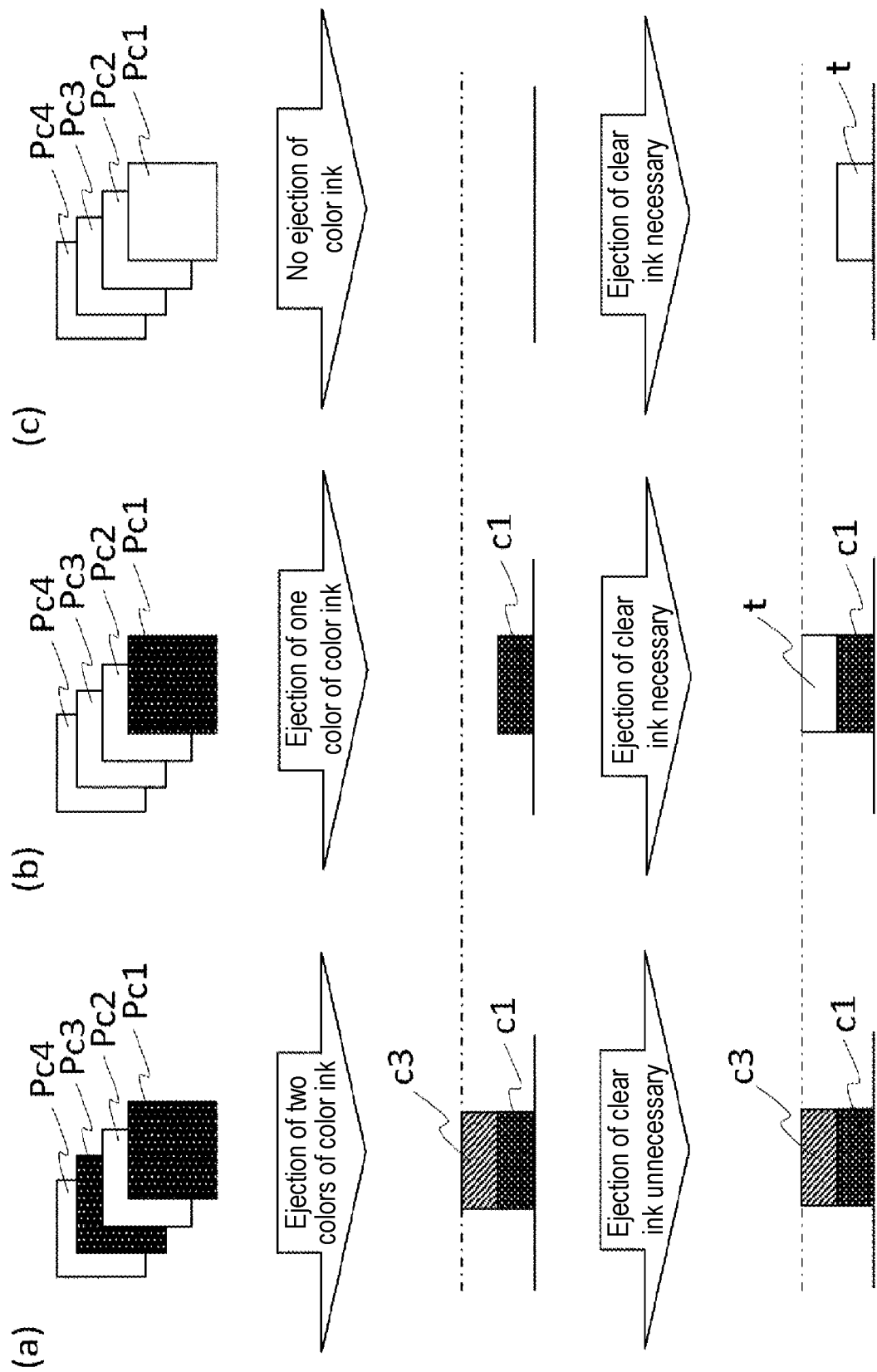
FIG. 6 is a diagram for describing a second specific example of an ejection position determining method in the clear ink ejection position determining means 143.
Figure 7:
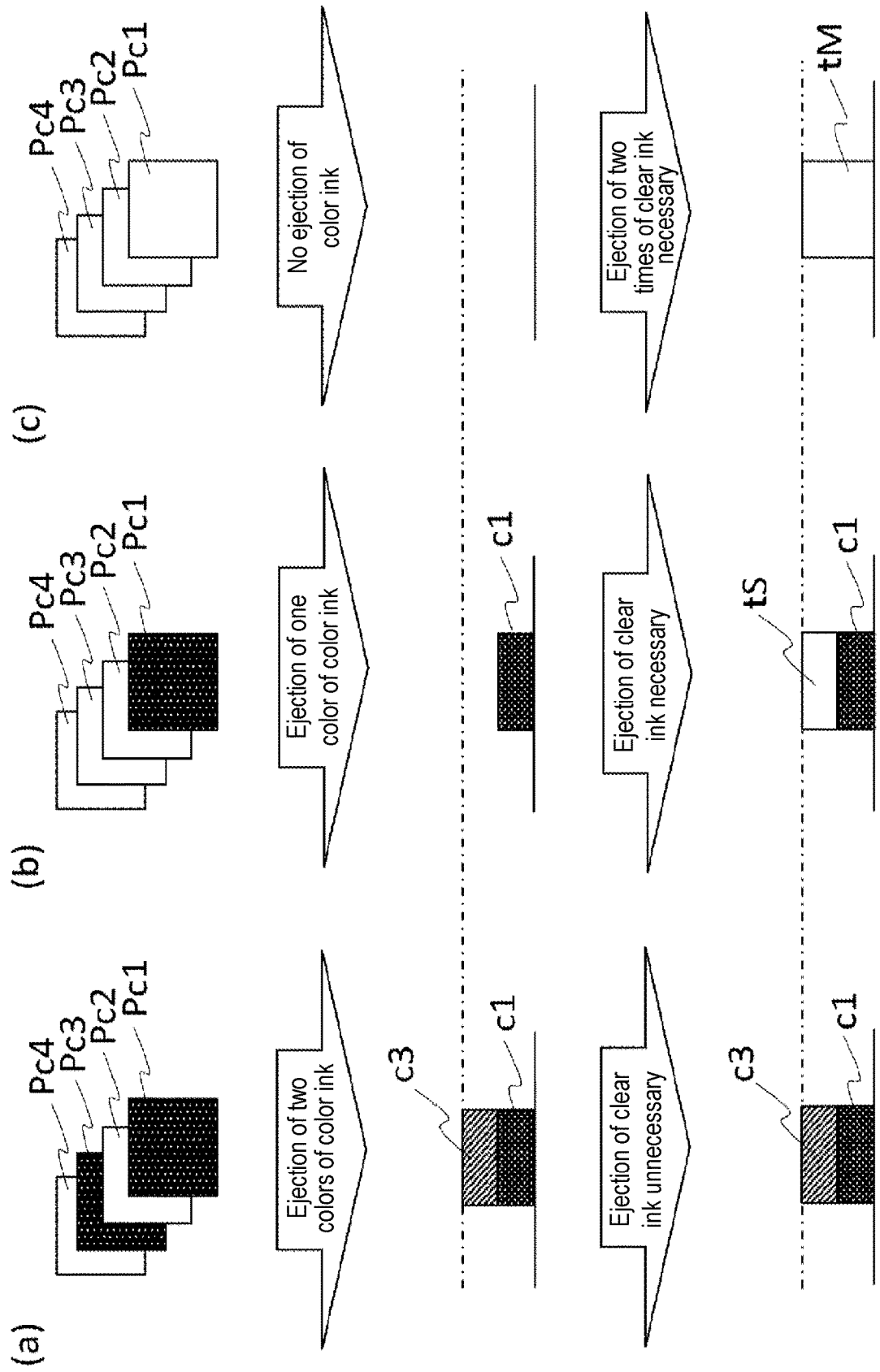
FIG. 7 is a diagram for describing a third specific example of an ejection position determining method in the clear ink ejection position determining means 143.

In the example of FIG. 6, a case where the color ink ejected to one ejection position is at most two colors and the clear ink inkjet head is a binary head has been described, but FIG. 7 illustrates a case where the clear ink inkjet head is a multi-value head. In this case, the clear ink is not ejected to the ejection position where the color inks of two colors (here, the color inks c1, c3) are ejected as illustrated in (*a*) of FIG. 7, the clear ink tS of an amount of the same extent as the color ink inkjet head is ejected to the ejection position where only the color ink of one color (here, the color ink c1) is ejected as illustrated in (*b*) of FIG. 7, and the clear ink tM of an amount twice the clear ink tS is ejected to the ejection position where the color ink of any color is not ejected as illustrated in (*c*) of FIG. 7, whereby the thickness of the layer of ink can be uniformized.

A fourth specific example of a method for determining the necessity of ejection of the clear ink will be described with reference to FIGS. 8 and 9. (*a*), (*b*), and (*c*) of FIG. 8 and (*a*), (*b*), and (*c*) of FIG. 9 illustrate that, when both the color ink inkjet head and the clear ink inkjet head are multi-value heads, for example, when ink can be ejected with three types (e.g., one time, two times, three times) of ejection amounts (dot sizes) for each inkjet head, pixels Pc1S (dot size S of color ink c1 (dot size of one time, and so on)), Pc2S (dot size S of color ink c2), Pc3S (dot size S of color ink c3), Pc4S (dot size S of color ink c4), Pc1M (dot size M of color ink c1 (dot size of two times, and so on)), Pc2M (dot size M of color ink c2), Pc3M (dot size M of color ink c3), Pc4M (dot size M of color ink c4), Pc1L (dot size L of color ink c1 (dot size of three times, and so on)), Pc2L (dot size L of color ink c2), Pc3L (dot size L of color ink c3), and Pc4L (dot size L of color ink c4) of the same position in the divided slice image divided into a total of twelve corresponding to three types of dot sizes for each of four colors of color inks c1, c2, c3, and c4 are respectively extracted, presence or absence of ejection of the color ink of each color and each dot size to the ejection position corresponding to the pixel can be identified based on the coloring of two gradations indicated by black or white in the pixels Pc1S, Pc2S, Pc3S, Pc4S, Pc1M, Pc2M, Pc3M, Pc4M, Pc1L, Pc2L, Pc3L, and Pc4L.

In this case, when the dot size is expressed by a numerical value in which the value increases as the size of the dot increases, the dot size of the clear ink to be ejected to the ejection position is determined such that the sum of the total of the values of the dot size of the ink of each color for coloring ejected to the ejection position determined by the color ink ejection position determining means 142 and the value of the dot size of the clear ink ejected to the ejection position becomes as close as possible to a predetermined reference value. The thickness of the layer of ink to be formed thus can be uniformized.

Figure 8:
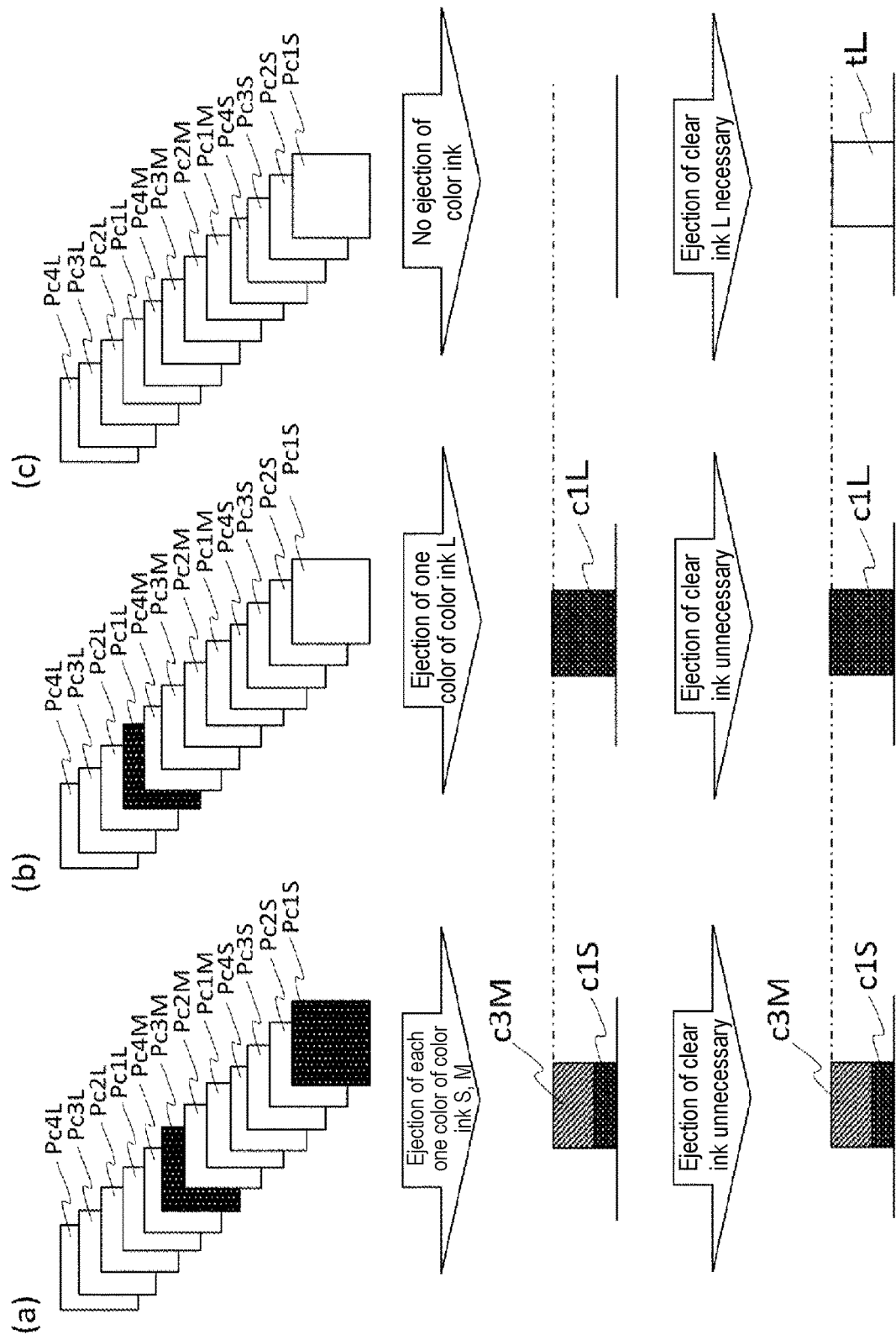
FIG. 8 is a diagram for describing a fourth specific example of an ejection position determining method in the clear ink ejection position determining means 143.
Figure 9:
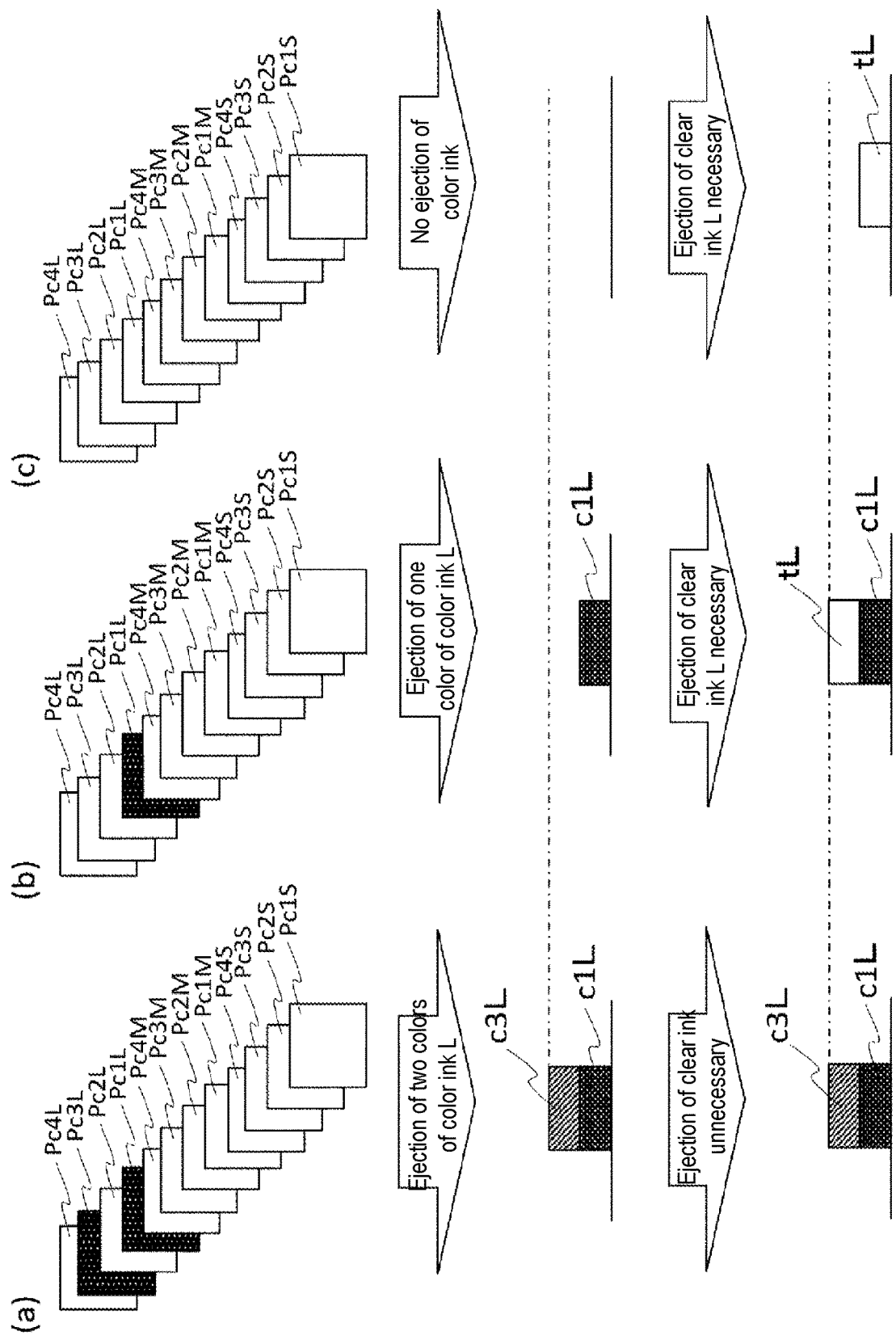
FIG. 9 is a different diagram for describing a fourth specific example of an ejection position determining method in the clear ink ejection position determining means 143.

FIG. 8 illustrates an example in which the predetermined reference value is 3. When the dot sizes S, M, and L are expressed by, for example, numerical values 1, 2, and 3, in the example of (*a*) of FIG. 8, the color ink c1 having the dot size of 1 and the color ink c3 having the dot size of 2 are ejected to the ejection position, and hence the total dot size is 3. Therefore, since the dot size has reached the predetermined reference value only with the color ink, determination is made not to eject the clear ink.

In the example of (*b*) of FIG. 8, since the color ink c1 having the dot size of 3 is ejected to the ejection position, the total dot size is 3. Therefore, since the dot size has reached the predetermined reference value only with the color ink, determination is made not to eject the clear ink.

Furthermore, in the example of (*c*) of FIG. 8, since the color ink is not ejected to the ejection position, the total dot size is 0. Thus, in this case, determination is made to eject the clear ink having the dot size of 3.

FIG. 9 illustrates an example in which the predetermined reference value is 6. When the dot sizes S, M, and L are expressed by, for example, numerical values 1, 2, and 3, in the example of (*a*) of FIG. 9, the color ink c1 having the dot size of 3 and the color ink c3 having the dot size of 3 are ejected to the ejection position, and hence the total dot size is 6. Therefore, since the dot size has reached the predetermined reference value only with the color ink, determination is made not to eject the clear ink.

In the example of (*b*) of FIG. 9, since the color ink c1 having the dot size of 3 is ejected to the ejection position, the total dot size is 3. Thus, in this case, determination is made to eject the clear ink having the dot size of 3.

Furthermore, in the example of (*c*) of FIG. 9, since the color ink is not ejected to the ejection position, the total dot size is 0. Therefore, in this case, it is desirable to eject the clear ink having the dot size of 6, but since the maximum dot size that can be ejected by the clear ink inkjet head here is 3, the thickness of the layer is insufficient with respect to the ejection position having the dot size of 6. However, it has been experimentally confirmed that even if the thickness is insufficient for some ejection positions as described above, for example, the shortage is substantially compensated by the excessively ejected ink flowing into other ejection positions, and the like when the flattening roller 113 flattens the layer of ink at a predetermined scanning cycle. Thus, in this case, the dot size of the clear ink may be determined as 3. If the clear ink inkjet head included in the head unit 110 can adopt the multi-pass method, for example, it is technically possible to cause the clear ink having the dot size of 3 to be ejected to the same ejection position twice in the forward path and the backward path. That is, according to this method, the clear ink having a dot size of 6 can be ejected, and the thickness of the layer of ink can be uniformized.

The clear ink ejection position determining means 143 generates, for each layer, a slice image for the clear ink in which the necessity to eject the clear ink to each of the ejection positions determined as described above is expressed by, for example, two gradations (i.e., presence of ejection and absence of ejection) in each pixel. When the clear ink inkjet head is a multi-value head, a slice image for the clear ink is generated for each dot size.

The layer forming means 144 reads information on the presence or absence of ejection of the coloring ink to each of the ejection positions and the necessity to eject the clear ink from the divided slice image of each color after the quantization process generated by the color ink ejection position determining means 142 and the slice image for the clear ink generated by the clear ink ejection position determining means 143, and controls the head unit 110 and the scanning driving unit 130 according to the information to cause the color ink head and the clear ink head to eject the ink of each color and the clear ink (S4: layer forming step). Thus, each layer of ink can be sequentially formed, and the formed layers can be layered to shape the shaped object 50.

Other Embodiments

Hereinafter, other embodiments of the present invention will be described. A difference between the embodiment described below and the previous embodiments lies in the content of the processing performed by the control unit 140, and the hardware configuration of the shaping device 100 and the structure of the shaped object 50 that is the object thereof are similar to those of the previous embodiments.

Figure 10:
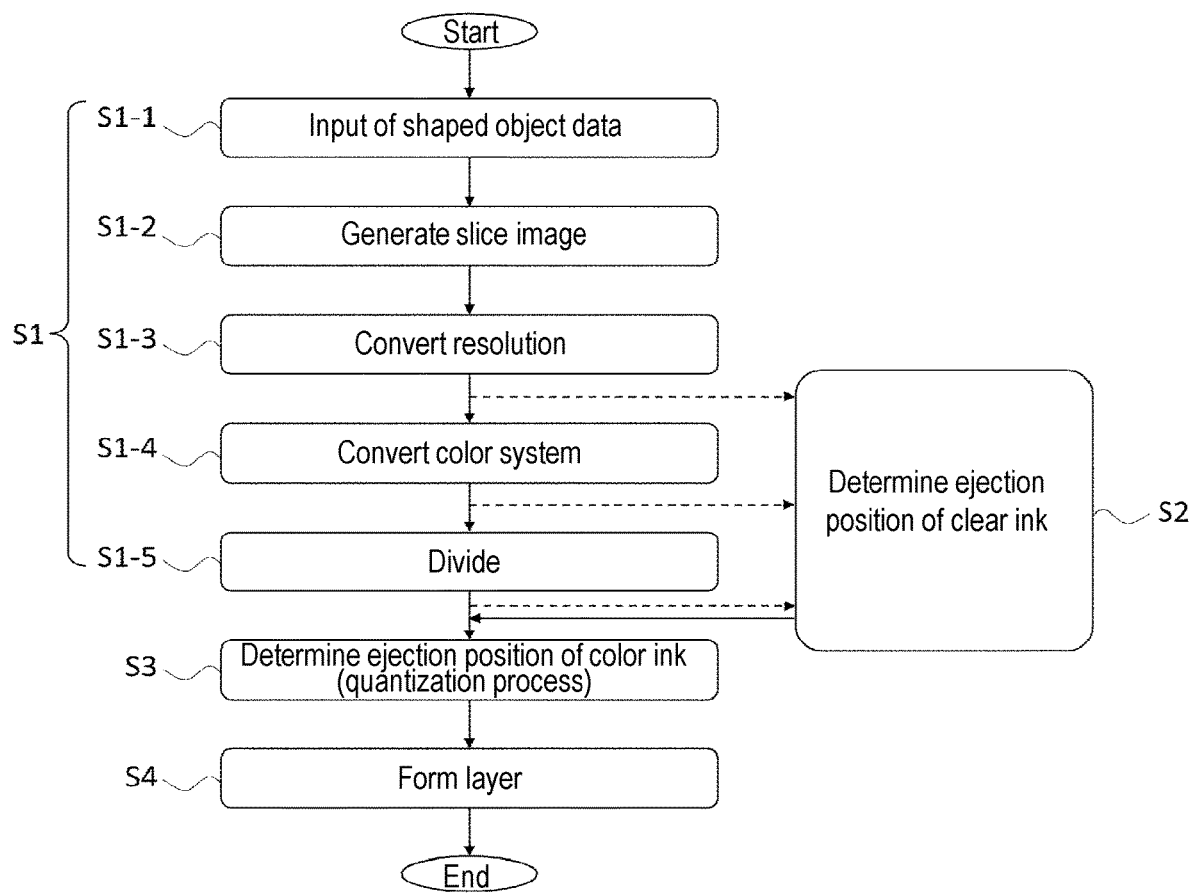
FIG. 10 is a diagram illustrating an example of a processing flow by a control unit 140.

FIG. 10 illustrates a processing flow of each means included in the control unit 140 of the present embodiment. The content of the slice image generating step (S1) is similar to the previous embodiment, and thus the description thereof will be omitted. The color ink ejection position determining means 142 of the present embodiment determines the presence or absence of ejection of each of the inks of a plurality of colors for coloring to each of the ejection positions constituting the layer of ink by the quantization process based on the slice image corresponding to the layer of ink (S3: color ink ejection position determining step). Specifically, for each layer of ink configuring the shaped object 50, the quantization process is executed on each divided slice image corresponding to the divided ink of each color.

Furthermore, here, the lesser gradations are two gradations corresponding to the presence of ejection and the absence of ejection of ink. In this case, the divided slice image in which each pixel is expressed in multiple gradations is converted into a divided slice image in which each pixel is expressed in two gradations.

Prior to the execution of the quantization process (S3) by the color ink ejection position determining means 142, the clear ink ejection position determining means 143 determines the necessity to eject the clear ink, which is a transparent ink, to the ejection position corresponding to the pixel based on the density of the pixel for each pixel in the coloring region of the slice image (S2: clear ink ejection position determining step).

That is, the method for determining the ejection position is a method for determining the necessity of ejecting the clear ink by estimating the presence or absence of ejection of the color ink to the corresponding ejection position after the quantization process based on the density of the pixel in the slice image before the execution of the quantization process.

Figure 11:
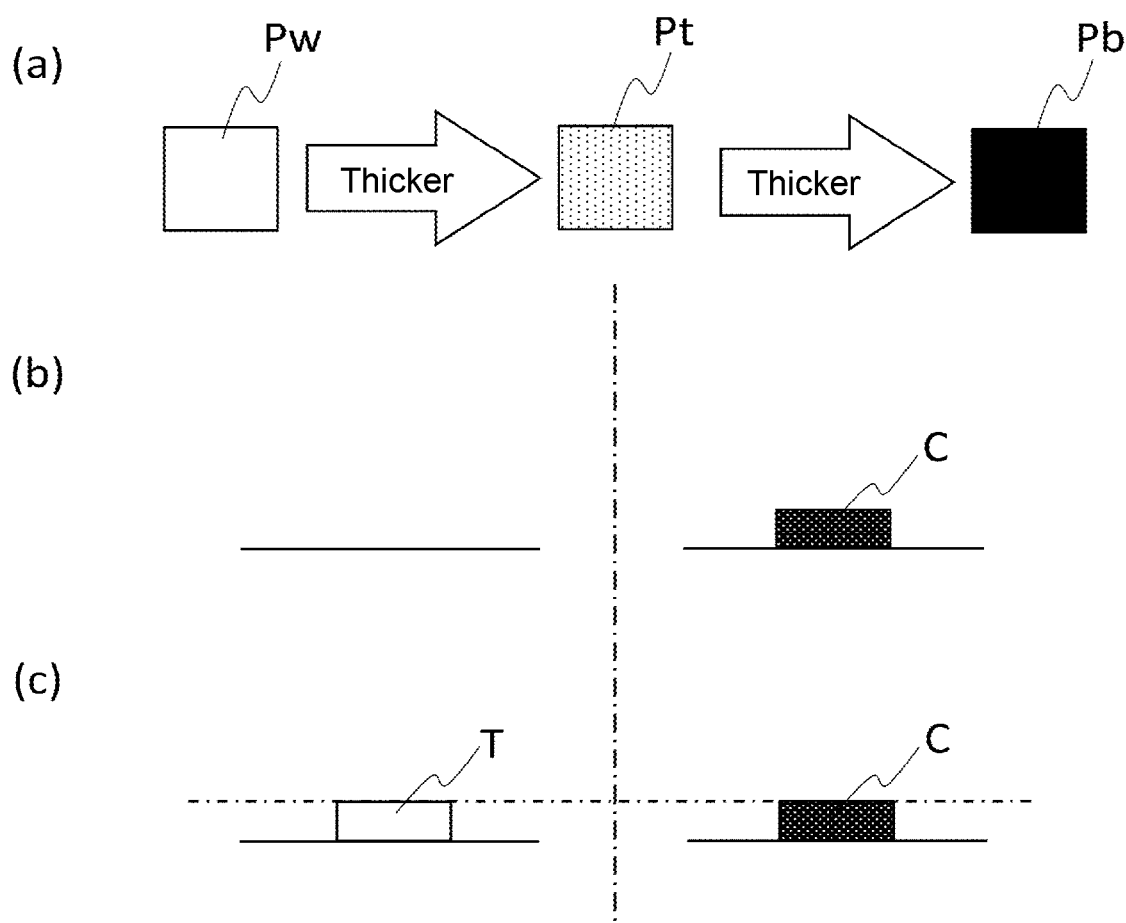
FIG. 11 is a diagram for describing an ejection position determining method in the clear ink ejection position determining means 143.

The method for determining the necessity of ejection of the clear ink will be described with reference to FIG. 11. (*a*) of FIG. 11 illustrates a pixel Pw having the thinnest density, a pixel Pt having the density that is the threshold value as to whether or not ejection of the clear ink is necessary, and a pixel Pb having the thickest density. (*b*) of FIG. 11 illustrates the presence or absence of ejection of the color ink C at the ejection position estimated after the quantization process. and in a case of a pixel in which the density is thin compared to the pixel Pt, it is estimated that the color ink C is not ejected at the corresponding ejection position, and in a case of a pixel in which the density is thick compared to the pixel Pt, it is estimated that the color ink C is ejected at the corresponding ejection position. Then, as illustrated in FIG. (*c*) of 11, the necessity of ejection is determined such that the clear ink T is ejected to the ejection position where the color ink C is estimated not to be ejected, and the clear ink T is not ejected to the ejection position where the color ink C is estimated to be ejected.

Thus, by not ejecting the clear ink T to the ejection position where the color ink is ejected, the thickness of the layer of ink can be made uniform, and the waste of the clear ink can be reduced.

When the resolution of the slice image is converted after the determination of the density of the pixel, correspondence between the relevant pixel and the ejection position becomes necessary separately, and thus the slice image to be the determination target of the density of the pixel is desirably that in which the pixel and the ejection position of the slice image correspond to each other on a one-to-one basis after the execution of the processing (S1-3) of converting the resolution to the shaping resolution of the shaping device 100.

On the other hand, if before the quantization process, the slice image to be the determination target of the density of the pixel may be that before the execution or that after the execution of the processing (S1-4) of converting a color that does not depend on the shaping device 100 to a color that matches the color ink of each color used in the shaping device 100, or that after the execution of the dividing process (S1-5).

Specifically, for example, the determination of the density of each pixel can be made based on the following scale.

If the slice image to be the determination target of the density of the pixel is for before the execution of the dividing process and the color of the pixel is expressed in the RGB color system, for example, it may be estimated that the color ink is not ejected to the corresponding ejection position and it may be determined that the ejection of the clear ink is required when a sum of the value of R, the value of G and the value of B of the pixel is greater than or equal to a predetermined threshold value. Furthermore, for example, the image may be converted into a grayscale image by an arbitrary method, and when the grayscale value of the pixel is greater than or equal to a predetermined threshold value, it may be estimated that the color ink is not ejected to the corresponding ejection position, and it may be determined that the ejection of the clear ink is required. Furthermore, for example, the RGB value of the pixel may be converted to the Lab value, and it may be estimated that the color ink is not ejected to the corresponding ejection position, and it may be determined that the ejection of the clear ink is required when the L value, which indicates brightness, is greater than or equal to a predetermined threshold value. Even when the color of the pixel is expressed by a color system other than the RGB color system, the necessity of ejection of the clear ink can be determined by a similar way of thinking as in the case of the RGB color system.

If the slice image to be the determination target of the density of the pixel is a divided slice image of after the execution of the dividing process and the divided slice image is generated for the ink color of each of C, M, Y, and K, for example, it may be estimated that the color ink is not ejected to the corresponding ejection position and it may be determined that the ejection of the clear ink is required when a sum of the value of C, the value of M, the value of Y, and the value of K of the same pixel is smaller than a predetermined threshold value. Even when the combination of colors and the number of types of colors of the divided slice image are different, the necessity of ejection of the clear ink can be determined by a similar way of thinking as in the case of the CMYK color system.

Furthermore, here, the method for determining the necessity of ejection of the clear ink to the corresponding ejection position only from the pixel value of the target pixel has been exemplified, but for example, the pixel value of the relevant pixel may be corrected in view of the surrounding pixel values of the relevant pixel by applying the slice image to some kind of filter (e.g., smoothing filter), and then the necessity of ejection of the clear ink to the corresponding ejection position may be determined based on the corrected pixel value.

The clear ink ejection position determining means 143 generates, for each layer, a slice image for the clear ink in which the necessity to eject the clear ink to each of the ejection positions determined as described above is expressed by, for example, two gradations (i.e., presence of ejection and absence of ejection) in each pixel.

When the clear ink inkjet head included in the head unit 110 is a head (multi-value head) in which a plurality of types of ejection amounts (dot sizes) can be selected and set, the ejection amount of the clear ink can be set in a step-wise manner according to the density of the pixel.

For example, when the ink color for coloring used in the shaping device 100 is four colors of CMYK, a case where the ink for coloring is not ejected, a case where one color is ejected, and a case where two colors are ejected at each of the ejection positions are assumed. Based on this assumption, two threshold values are provided for the density of the pixels in the slice image before the execution of the quantization process, where it can be presumed that when thinner than the thinner threshold value, the coloring ink is not ejected to the ejection position, when thicker than the thinner threshold value and thinner than the thicker threshold value, one color of the coloring ink is ejected, and when thicker than the thicker threshold value, two colors of the coloring ink are ejected. Therefore, when the density of the pixel is thinner than the thinner threshold value, the clear ink is ejected more (with a larger dot size), when the density is thicker than the thinner threshold value and thinner than the thicker threshold value, the clear ink is ejected less (with a smaller dot size), and when the density is thicker than the thicker threshold value, the clear ink is not ejected, whereby the thickness of the layer of ink can be made uniform.

Figure 12:
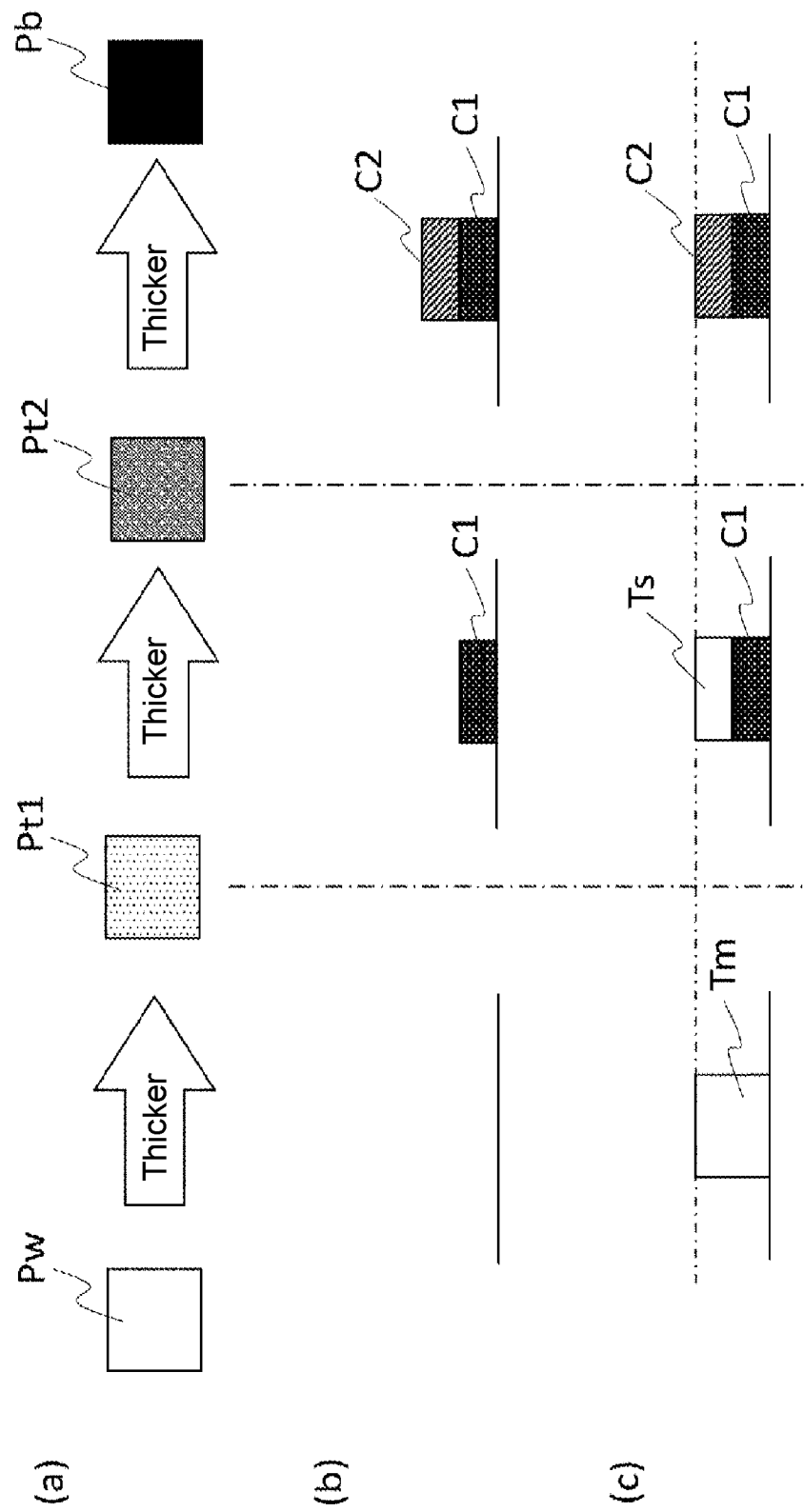
FIG. 12 is a different diagram for describing an ejection position determining method in the clear ink ejection position determining means 143.

The method for determining the necessity of ejection of the clear ink for this case will be specifically described with reference to FIG. 12. (*a*) of FIG. 12 illustrates a pixel Pw having the thinnest density, a pixel Pt1 having the density to be a first threshold value for the necessity of ejection of the clear ink, a pixel Pt2 having the density to be a second threshold value thicker than the first threshold value, and a pixel Pb having the thickest density. (*b*) of FIG. 12 illustrates the presence or absence of the ejection of a first color ink C1 and a second color ink C2 at the ejection position, which is estimated after the quantization process. At this time, in a case of a pixel whose density is thinner than the pixel Pt1, it is estimated that no color ink has been ejected at the corresponding ejection position, in a case of a pixel whose density is thicker than the pixel Pt1 and thinner than the pixel Pt2, it is estimated that only the first color ink C1 has been ejected at the corresponding ejection position, and in a case of a pixel whose density is thicker than the pixel Pt2, it is estimated that both color inks have been ejected at the corresponding ejection position. Then, as shown in FIG. (*c*) of 12, the necessity of ejection is determined such that a larger amount of the clear ink Tm is ejected to the ejection position where it is estimated that no color ink has been ejected, a smaller amount of the clear ink Ts is ejected to the ejection position where it is estimated that only the first color ink C1 has been ejected, and the clear ink is not ejected to the ejection position where it is estimated that both color inks have been ejected.

In this case, the clear ink ejection position determining means 143 generates, for each layer, two slice images for the clear ink in which the necessity of ejection of the clear ink to each of the ejection positions determined as described above is expressed with two gradations corresponding to the presence of ejection and the absence of ejection in each pixel for example, for each of the presence of ejection (large dot size) and the presence of ejection (small dot size).

Thus, the thickness of the layer of ink can be made uniform, and the waste of the clear ink can be reduced by increasing or decreasing the ejection amount of the clear ink according to the ejection amount of the color ink.

Furthermore, in the step-wise ejection amount of the clear ink, even if the clear ink inkjet head included in the head unit 110 is a head (binary head) in which only one type of ejection amount can be set at a normal ejection timing, it is technically possible to cause the clear ink to be ejected to the same ejection position twice, for example, in the forward path and the backward path as long as the multi-path method can be adopted. Therefore, even in this case, the increase or decrease in the ejection amount of the clear ink according to the ejection amount of the color ink can be realized by a method similar to the case where the multi-value head is adopted.

The layer forming means 144 reads information on the presence or absence of ejection of the coloring ink to each of the ejection positions and the necessity to eject the clear ink from the divided slice image of each color after the quantization process generated by the color ink ejection position determining means 142 and the slice image for the clear ink generated by the clear ink ejection position determining means 143, and controls the head unit 110 and the scanning driving unit 130 according to the information to cause the color ink head and the clear ink head to eject the ink of each color and the clear ink (S4: layer forming step). Thus, each layer of ink can be sequentially formed, and the formed layers can be layered to shape the shaped object 50.

The shaping device 100 of the present invention described above determines the necessity of ejection of the clear ink for each of the ejection positions and ejects the clear ink according thereto, whereby the usage amount of the clear ink at the time of forming each layer can be saved, and the scraped amount of ink at the time of flattening can also be reduced, so that the degradation of the quality of the surface of the shaped object can be suppressed.

Note that the present invention is not limited to each embodiment described above. Each embodiment described above is an example, and anything having substantially the same configuration as the technical idea described in the claims of the present invention and exhibiting the same operation and effect is included in the technical scope of the present invention. That is, each embodiment described above can be appropriately changed within the scope of the technical idea expressed in the present invention, and modes to which such changes and improvements are added are also included in the technical scope of the present invention.

The invention claimed is:

1. A shaping device that shapes a shaped object by forming and layering each layer as a layer of ink based on a plurality of slice images indicating cross-sectional shapes and color arrangements of respective layers of the shaped object at different positions in a layering direction defined in advance, the shaping device comprising:
    a color ink head configured to eject inks of a plurality of colors;
    a clear ink head configured to eject a clear ink; and
    a processor configured to:
        divide the slice image of each layer into a plurality of divided slice images by each color represented by the ink of each color, wherein each divided slice image corresponds to the ink of the color used;
        determine presence or absence of ejection of each of the inks of the plurality of colors for coloring to each ejection position constituting the layer by a quantization process based on the slice image corresponding to the layer;
        determine necessity of ejection of the clear ink, which is a transparent ink, to each of the ejection positions based on the determined presence or absence of ejection of each of the inks of the plurality of colors for coloring at each of the ejection positions; and
        form the layer by causing the color ink head and the clear ink head to eject each of the inks of the plurality of colors and the clear ink to each of the ejection positions according to determinations of the presence or absence of ejection of each of the inks of the plurality of colors and the necessity of ejection of the clear ink.

2. The shaping device as set forth in claim 1, wherein the processor is further configured to:
    determine a dot size of each of the inks of the plurality of colors to be ejected;
    determine the presence or absence of ejection and a dot size of the clear ink at each of the ejection positions based on the determined presence or absence of ejection and the determined dot size of each of the inks of the plurality of colors for coloring at each of the ejection positions; and
    cause the color ink head and the clear ink head to eject each of the inks of the plurality of colors and the clear ink in the determined dot sizes according to the determinations of the presence or absence of ejection of each of the inks of the plurality of colors and the necessity of ejection of the clear ink to each of the ejection positions.

3. The shaping device as set forth in claim 2, wherein when the dot size is expressed by a numerical value in which a value increases as a size of a dot increases, the processor is configured to determine the dot size of the clear ink to be ejected to the ejection position such that a sum of a total of values of the determined dot sizes of the inks of the colors for coloring ejected to the ejection position and a value of the dot size of the clear ink ejected to the ejection position becomes equal to a predetermined reference value.

4. A shaping method that shapes a shaped object by forming and layering each layer as a layer of ink based on a plurality of slice images indicating cross-sectional shapes and color arrangements of respective layers of the shaped object at different positions in a layering direction defined in advance, the shaping method comprising:
    dividing the slice image of each layer into a plurality of divided slice images by each color represented by each of inks of a plurality of colors, wherein each divided slice image corresponds to the ink of the color used;
    determining presence or absence of ejection of each of the inks of the plurality of colors for coloring to each ejection position constituting the layer by a quantization process based on the slice image corresponding to the layer;
    determining necessity of ejection of a clear ink, which is a transparent ink, to each of the ejection positions based on the determined presence or absence of ejection of the each of the inks of the plurality of colors for coloring at each of the ejection positions; and
    causing a color ink head and a clear ink head to eject each of the inks of the plurality of colors and the clear ink, respectively, to each of the ejection positions according to determinations of the presence or absence of ejection of each of the inks of the plurality of colors and the necessity of ejection of the clear ink.

5. The shaping method as set forth in claim 4, further comprising:
    determining a dot size of each of the inks of the plurality of colors to be ejected;
    determining the presence or absence of ejection and a dot size of the clear ink to each of the ejection positions based on the determined presence or absence of ejection and the determined dot size of each of the inks of the plurality of colors for coloring at each of the ejection positions; and
    causing the color ink head and the clear ink head to eject each of the inks of the plurality of colors and the clear ink in the determined dot sizes according to the determinations of the presence or absence of ejection of each of the inks of the plurality of colors and the necessity of ejection of the clear ink to each of the ejection positions.

6. The shaping method as set forth in claim 5, wherein when the dot size is expressed by a numerical value in which a value increases as a size of a dot increases, determining the dot size of the clear ink to be ejected to the ejection position such that a sum of a total of values of the determined dot sizes of the inks of the colors for coloring ejected to the ejection position and a value of the dot size of the clear ink ejected to the ejection position becomes equal to a predetermined reference value.

7. A shaping device that shapes a shaped object by forming and layering each layer as a layer of ink based on a plurality of slice images indicating cross-sectional shapes and color arrangements of respective layers of the shaped object at different positions in a layering direction defined in advance, the shaping device comprising:
    a color ink head configured to eject inks of a plurality of colors;
    a clear ink head configured to eject a clear ink; and
    a processor configured to:
        determine presence or absence of ejection of each of the inks of the plurality of colors for coloring to each ejection position constituting the layer by a quantization process based on the slice image corresponding to the layer;

prior to execution of the quantization process, determine necessity of ejection of the clear ink, which is a transparent ink, to the ejection position corresponding to a pixel based on a density of color ink on the pixel for each pixel in a coloring region of the slice image, wherein the density of the color ink indicates a thickness of the color ink at the ejection position of the layer corresponding to the pixel and is determined for each of the pixels in each of the slice images;

form the layer by causing the color ink head and the clear ink head to eject each of the inks of the plurality of colors and the clear ink to each of the ejection positions according to determinations of the presence or absence of ejection of each of the inks of the plurality of colors and the necessity of ejection of the clear ink.

8. The shaping device as set forth in claim 7, wherein the slice image is an image in which a pixel value is indicated in a plurality of gradations for each color of a predetermined color system in each of the pixels.

9. The shaping device as set forth in claim 7, wherein the slice image is divided for each color of the inks of the plurality of colors, and includes a plurality of images in which pixel values are indicated in a plurality of gradations at each of the pixels.

10. The shaping device as set forth in claim 7, wherein the processor is further configured to:

determine a dot size of the clear ink based on the density of the color ink on the pixel in a case where ejection is present; and cause the clear ink head to eject the clear ink in the determined dot size according to the determination of the necessity of ejection of the clear ink to each of the ejection positions.

11. The shaping device as set forth in claim 8, wherein the processor is further configured to:

determine a dot size of the clear ink based on the density of the color ink on the pixel in a case where ejection is present; and cause the clear ink head to eject the clear ink in the determined dot size according to the determination of the necessity of ejection of the clear ink to each of the ejection positions.

12. The shaping device as set forth in claim 9, wherein the processor is further configured to:

determine a dot size of the clear ink based on the density of the color ink on the pixel in a case where ejection is present; and cause the clear ink head to eject the clear ink in the determined dot size according to the determination of the necessity of ejection of the clear ink to each of the ejection positions.

* * * * *